United States Patent [19]

Lacey et al.

[11] Patent Number: 4,987,772

[45] Date of Patent: Jan. 29, 1991

[54] SMOKE MEASURING APPARATUS

[75] Inventors: Simon J. Lacey, Ipswich; Roy Haworth, Greenford, both of England

[73] Assignee: Lucas Industries, United Kingdom

[21] Appl. No.: 426,324

[22] Filed: Oct. 24, 1989

[30] Foreign Application Priority Data

Oct. 25, 1988 [GB] United Kingdom ................ 8824962

[51] Int. Cl.[5] ........................................ G01M 15/00

[52] U.S. Cl. ................................................ 73/117.3

[58] Field of Search .................... 73/116, 117.2, 117.3, 73/119 A; 123/477, 489; 60/276; 356/438, 439

[56] References Cited

U.S. PATENT DOCUMENTS 4,519,353 5/1985 Ito et al. ............................ 123/459
4,760,830 8/1988 Bullis et al. ....................... 73/117.3

*Primary Examiner*—Robert Raevis
*Attorney, Agent, or Firm*—Andrus, Sceales, Starke & Sawall

[57] ABSTRACT

An apparatus for providing an indication of the level of smoke in an engine exhaust includes a radiation sensor which is mounted in a combustion chamber of the engine. The signal produced by the sensor during combustion of fuel is processed to produce a signal representing the period of combustion of fuel in the cylinder and this signal is applied to a map which contains recorded data showing the relationship between the combustion period and the level of smoke. From the map the level of smoke can be obtained.

3 Claims, 3 Drawing Sheets

SMOKE MEASURING APPARATUS

This invention relates to a method and apparatus for providing an indication of the level of smoke in the exhaust of a compression ignition engine.

A known method and apparatus for the above purpose comprises drawing a predetermined volume of exhaust gas through a filter paper of a given area and then assessing the discolouration of the filter paper. Such a test even with semi-automatic equipment requires time to complete so that the results of a particular test may not be available for several seconds.

An alternative method involves the measurement of the opacity of the smoke either by sampling or looking at the entire exhaust gas flow. This is adequate for steady speed and load conditions where the time taken for the smoke to travel from the combustion chamber to the measurement zone does not matter but it is not suitable for use under conditions where the speed and load are varying particularly where the signal is intended to be used in an engine management system. Moreover, care has to be taken to ensure that the radiation responsive surfaces do not become coated with soot.

The object of the present invention is to provide a method and apparatus for the purpose specified in a simple and convenient form.

According to the invention a method of providing an indication of the level of smoke in the exhaust of a compression ignition engine comprises observing using a radiation responsive sensor, the radiation produced by the combustion of fuel in a combustion space of the engine, processing the signal produced by the sensor to provide a further signal representing the period of combustion of fuel in the combustion chamber and feeding said signal into a combustion period/smoke map for the engine to provide an indication of the level of smoke in the engine exhaust.

According to a further feature of the invention an apparatus for providing an indication of the level of smoke in the exhaust of a compression ignition engine comprises a radiation responsive sensor adapted to be mounted on the engine so that it can observe the radiation produced by the combustion of fuel in a combustion chamber of the engine, means for processing the signal produced by the sensor to provide a second signal representing the period of combustion of fuel in the combustion chamber, a data map containing prerecorded data showing the relationship between the level of smoke in the engine exhaust and the period of combustion of fuel and means for extracting from said data map the level of smoke which corresponds to said second signal.

Figure 1:
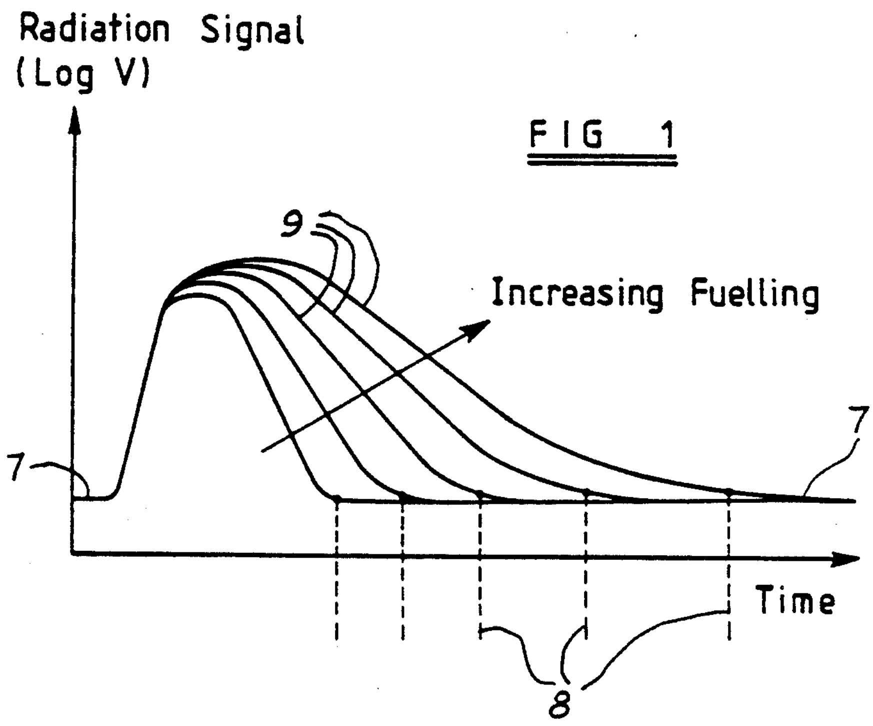
Figure 2:
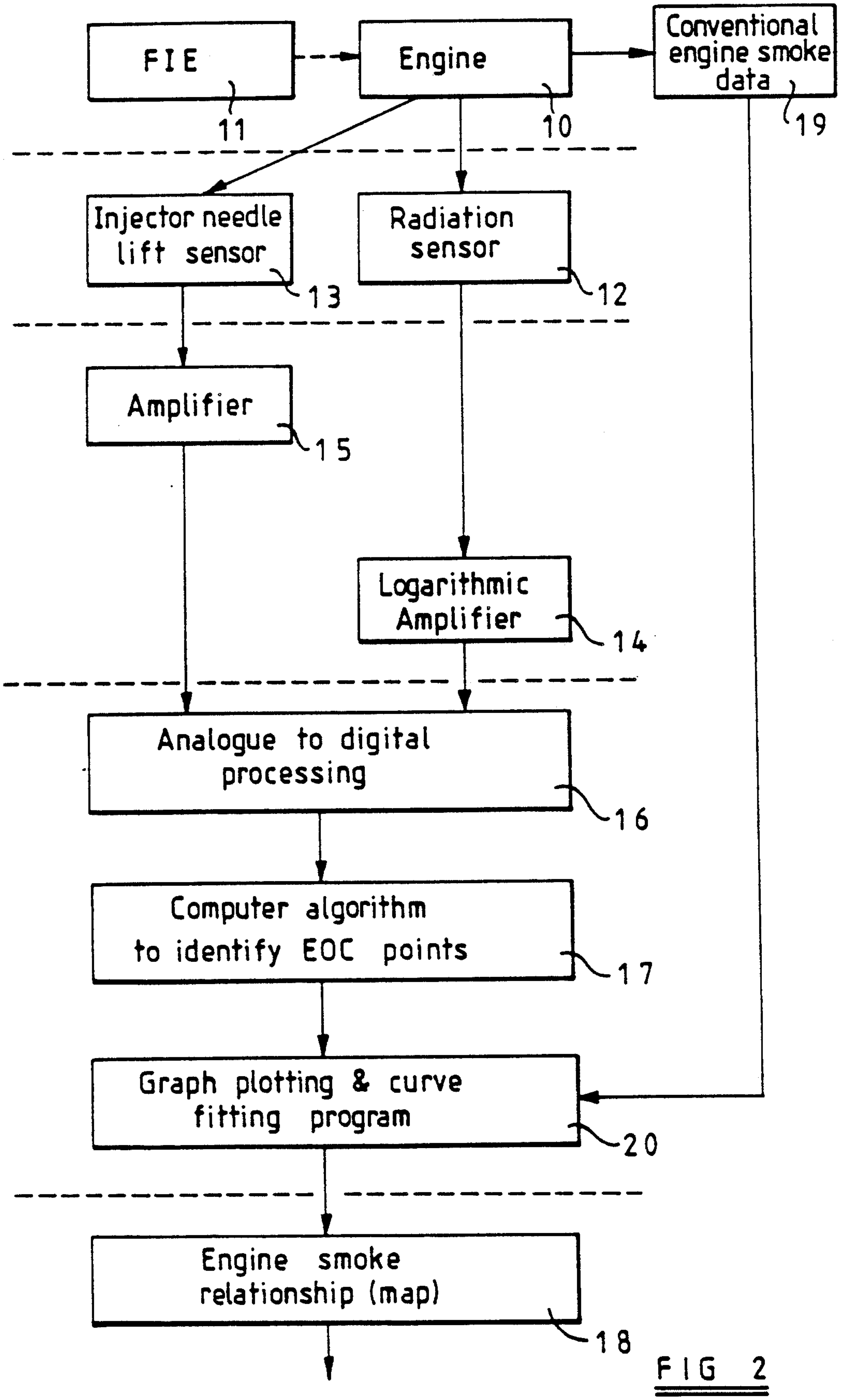
Figure 3:
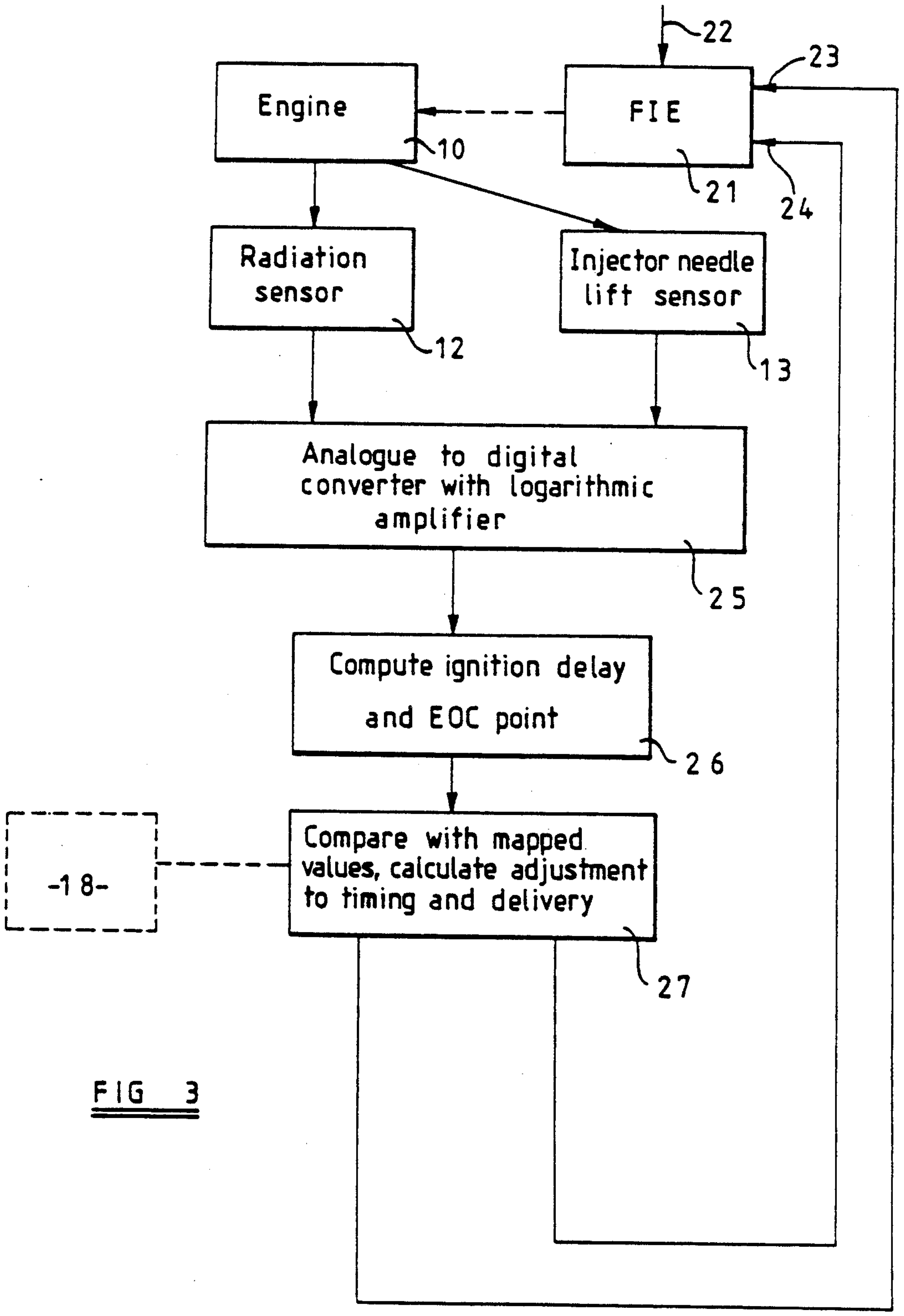

An example of the method and apparatus will now be described with reference to the accompanying drawings in which:

FIG. 1 shows a graph indicating the relationship between the radiation envelope of the burning fuel within an engine combustion chamber and the level of fuel supplied to the combustion chamber, FIG. 2 is a block diagram showing the process of producing a smoke map, and FIG. 3 is a block diagram illustrating the use of the invention for controlling the fuel supply to an engine.

Referring to FIG. 1 of the drawings the curves illustrate the variations with respect to time of the logarithm of the signal produced by a sensor or sensors mounted in the cylinder head of an engine, with time considered in terms of engine degrees of rotation, and for different fuel quantity levels. The sensor is of the kind described in GB No. 2193804A. If the time is measured from the instant of fuel delivery to the combustion chamber it will be seen that after the ignition delay period the amplitude of the radiation signal rises rapidly to a peak value from a residual level 7 and then decays back to the residual level as the combustion of fuel is completed. The decaying portion of the envelope exhibits a characteristic double slope and the slope of the initial portion 9 of the decaying portion of the envelope decreases as the amount of fuel supplied to the engine is increased and the time taken for the signal to decay to the residual level therefore increases. The slope of the initial portion 9 of the decaying portion of the curve can be assessed but it is preferred to assess the so called "end of combustion point" using computer based techniques. The "end of combustion point" is indicated at 8 in FIG. 1 being the point at which combustion ceases and the radiation signal returns to the residual level 7.

It has been found that for a particular type of engine there is a correlation between the period of combustion of fuel as determined by the time between fuel delivery and the end of combustion point and the level of smoke in the engine exhaust and that it is possible to construct a map which shows the relationship between the period of combustion and the level of smoke for different engine speeds. For the purpose of constructing the map, the actual smoke level does have to be measured using one of the known techniques mentioned above. However, once the map has been constructed it is possible to provide a signal or reading of the smoke level in the engine exhaust based upon a determination of the period of combustion. The reading can be obtained quickly so that the process of smoke assessment and determination in an engine test situation is facilitated as compared with the known methods. As an alternative to assessment of the end of combustion point 8 using the aforesaid computer based technique it is possible to use the point at which the slope change takes place on the decaying portion of the envelope.

FIG. 2 shows in block form the process of constructing the so called map. The engine is indicated at 10 and is supplied with fuel in timed relationship, by a fuel injection system indicated at 11. The engine is fitted with a radiation sensor 12 of the kind described in the aforesaid specification and the fuel injection nozzle of the combustion space with which the radiation sensor is associated, is fitted with a needle lift sensor 13 which provides an indication of the lifting of the valve member of the nozzle from its seating and therefore the commencement of fuel delivery to the combustion space.

The signals provided by the two sensors are amplified by amplifiers 14 and 15 respectively, the amplifier 14 being a logarithmic amplifier. The signals provided by the amplifiers are then subject to computer analysis, the first step of which is to convert the analog signals to digital signals in a converter 16 after which the aforesaid end of combustion point is determined by the use of a suitable algorithm. This process is illustrated as being carried out in the box 17. In order to produce the map 18, the engine is operated on a test basis under steady state conditions and a conventional smoke meter 19 is utilised to determine the level of smoke in the engine exhaust. The engine exhaust is sampled at engine operating conditions both below and above full load, and the smoke level reading provided by the smoke meter 19 is supplied along with the end of combustion point to a processing stage 20 which fixes a point on the map. The engine is tested at various fuel levels and speeds in order to produce the map 18. Experiments have indicated that the level of smoke is also dependant upon the instant at which fuel is delivered to the engine and therefore by carrying out engine tests as described but in this case varying the instant of fuel delivery the map produced will be able to provide an identification of the level of smoke for varying values of engine speed, the quantity of fuel supplied to the engine and the timing of fuel delivery.

Once the smoke map has been produced for a particular engine it is possible when running or testing an engine of that type, to predict the level of smoke in the engine exhaust on determination of the end of combustion point.

The concept of the invention can be used in vehicle engine installation in order to ensure that in the use of the vehicle no more than the permitted level of smoke occurs in the engine exhaust at conditions of engine operation. In a vehicle engine installation the amount of fuel supplied to the engine will depend upon the demand placed on the engine by the driver of the vehicle. However, apart from the level of smoke in the engine exhaust there are other limits which may not be exceeded in the use of the vehicle for example, the engine speed. The fuel injection system of the engine will therefore be controlled by a governor which will at least control the idling speed and the maximum speed of the engine. In the case of a two speed governor the amount of fuel supplied to the engine intermediate the idling and maximum speeds depends on the driver whereas if the governor is an all speed governor the driver will in effect select the desired engine speed and the governor will cause the fuel system to supply an amount of fuel to achieve or maintain that speed. In both cases, however, it is essential to ensure that the amount of smoke in the engine exhaust does not exceed the permitted level.

In the prior fuel systems extensive engine testing is carried out to determine the maximum amount of fuel which can be supplied to the engine before the smoke level is exceeded. The fuel system can then be designed to ensure that no more than that maximum amount of fuel is supplied. In practice the actual maximum amount is slightly reduced in order to be absolutely sure that the smoke level will not be exceeded during the life of the engine and to take care of the fact that the testing may have taken place on a "good" engine. The aforesaid maximum amount of fuel depends on engine speed, air and engine temperature and the pressure of air in the inlet manifold of the engine testing. In addition a necessary test is a full load acceleration test.

The aforesaid testing is carried out in a test cell and it is not generally the practice to test each production engine together with its fuel system following assembly. However, each fuel system is set or calibrated in accordance with the test results obtained. A production engine will in most instances, be operated at slightly less than the maximum power. If, however, the acutal smoke level in the engine exhaust during the operation of the engine can be assessed it is possible to operate the engine if so required by the driver, at its maximum smoke limited power.

With the end of combustion/smoke map appropriate to the particular type of engine, the aforesaid mode of operation is possible.

From the sensors 12, 13 it is possible to obtain three signals the first being the start of injection of fuel, the second being the start of combustion and the third being the end of combustion. Under cool operating conditions for example when the engine has just been started from cold, the ignition delay period is extended. The same applies even when the engine is hot, if a poorer quality fuel is supplied to the engine. These factors can be taken into account.

In FIG. 3 there is shown a block diagram of a system for use with a production engine. In the diagram the same reference numerals where appropriate are used as are used in the diagram of FIG. 2. The fuel injection system 21 includes a governor which is responsive to driver demand as represented by an input signal 22. The system is also supplied with two further input signals 23, 24, the signal 23 being a timing adjustment signal and the signal 24 being a fuel delivery quantity adjustment signal.

The signals provided by the sensors 12 and 13 are supplied to an analog/digital convertor 25 which includes amplifiers, the amplifier associated with the sensor 12 being a logarithmic amplifier. From the digital signals derived from the sensor signals the end of combustion point is determined and hence the combustion period as measured from the instant of fuel delivery. The computation of the combustion period is indicated in the diagram at 26.

The computed combustion period together with the engine speed and the timing of fuel delivery are then identified on the map 18 and if the smoke value thus obtained is greater than the allowed value, a caculation in a comparison and calculation stage 27 is effected to adjust the quantity of fuel supplied to the engine. The timing of fuel delivery can be adjusted but the extent of adjustment possible is limited since, for example, although advancing the timing of fuel delivery will tend to reduce the the level of smoke in the engine exhaust, it will result in an increase in the level of nitrogen oxides in the exhaust. It would be more usual therefore to adjust the timing of delivery of fuel in accordance with engine speed and the fuel quantity and to use the signal 23 to effect limited timing adjustment. The comparison with the map 18 and the generation of the signals 23, 24 to adjust the timing of fuel delivery and the quantity of fuel delivery are effected in the stage 27.

With the arrangement described it is therefore possible if so required by the driver of the vehicle to operate the engine at maximum power within the allowed speed range, using the smoke level in the engine exhaust as the controlling factor.

We claim:

1. A method of providing an indication of the level of smoke in the exhaust of a compression ignition engine characterized by observing using a radiation responsive sensor, the radiation produced by combustion of fuel in a combustion space of the engine, processing the signal produced by the sensor to provide a further signal representing the period of combustion of fuel in the combustion chamber, feeding said further signal into a combustion period/smoke map for the engine to provide an indication of the level of smoke in the engine exhaust.

2. An apparatus for providing an indication of the level of smoke in the exhaust of a compression ignition engine characterized by a radiation responsive sensor adapted to be mountd on the engine so that it can observe the radiation produced by the combustion of fuel in a combustion chamber of the engine, means for processing the signal produced by the sensor to provide a second signal representing the period of combustion of fuel for various engine operating conditions in the combustion chamber, a data map containing pre-recorded data showing the relationship between the level of smoke and the period of combustion of fuel and means for extracting from said data map the level of smoke which corresponds to said second signal.

3. A fuel supply system for a compression ignition engine comprising a fuel injection nozzle through which fuel is supplied to a combustion space of the engine, fuel supply means for supplying fuel under pressure to the nozzle, and a sensor for providing a signal indicative of the start of delivery of fuel through the nozzle, characterized by a radiation sensor responsive to the radiation produced by the combustion of fuel in said combustion space, means for calculating from the signals produced by said sensors the period of combustion of fuel in said combustion space, a map containing pre-recorded data showing the relationship between the level of smoke in the engine exhaust and the period of combustion of fuel at various values of engine speed, fuel quantity, and the timing of fuel delivery, and further means responsive to the calculated value of the period of combustion and the corresponding value of the smoke level as extracted from the map, for controlling the quantity and the timing of fuel supply through said nozzle.

* * * * *